United States Patent
Sahlberg et al.

(10) Patent No.: US 9,625,031 B2
(45) Date of Patent: Apr. 18, 2017

(54) SELECTION OF LAUNCH RATIO IN A MULTI-SPEED AUTOMATIC TRANSMISSION

(71) Applicant: JAGUAR LAND ROVER LIMITED, Warwickshire (GB)

(72) Inventors: Emil Sahlberg, Coventry (GB); Andi Lowndes, Coventry (GB); Kirk Bradshaw, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 14/912,298

(22) PCT Filed: Aug. 7, 2014

(86) PCT No.: PCT/EP2014/067040
§ 371 (c)(1),
(2) Date: Feb. 16, 2016

(87) PCT Pub. No.: WO2015/024793
PCT Pub. Date: Feb. 26, 2015

(65) Prior Publication Data
US 2016/0186856 A1  Jun. 30, 2016

(30) Foreign Application Priority Data
Aug. 19, 2013 (GB) .................................. 1314797.0

(51) Int. Cl.
*F16H 61/02* (2006.01)
*F16H 59/62* (2006.01)
(Continued)

(52) U.S. Cl.
CPC ......... *F16H 61/0213* (2013.01); *F16H 59/62* (2013.01); *F16H 59/64* (2013.01); *F16H 2059/663* (2013.01); *F16H 2061/023* (2013.01)

(58) Field of Classification Search
None
See application file for complete search history.

(56) References Cited

U.S. PATENT DOCUMENTS 5,484,350 A   1/1996  Ishikawa et al.
5,501,644 A *  3/1996  Zhang ................. F16H 61/0213
                                                      477/97

(Continued)

FOREIGN PATENT DOCUMENTS

DE   19951107 A1   5/2001
DE   10248398 A1   6/2004
EP    1138985 A2  10/2001

OTHER PUBLICATIONS

International Search Report and Written Opinion of the International Searching Authority for International application No. PCT/EP2014/067040 dated Oct. 21, 2014.

(Continued)

*Primary Examiner* — Justin Holmes
(74) *Attorney, Agent, or Firm* — Carlson, Gaskey & Olds

(57) ABSTRACT

A method and apparatus for modifying the shift map of an automatically controlled vehicle transmission having individually selectable speed ratios. A calibrator determines launch ratio from a plurality of speed ratios and is responsive to ambient pressure and/or ambient temperature. The calibrator may be further responsive to engine speed, engine temperature, transmission temperature, gradient and direction of gradient.

21 Claims, 3 Drawing Sheets

| GASOLINE | | |
|---|---|---|
| Altitude | | Ambient Temp |
| m | ft | 1st gear launch BELOW: |
| Sealevel | | -25°C |
| 650 | 2000 | -8°C |
| 900 | 3000 | -4°C |
| 1200 | 4000 | 1°C |
| 1500 | 5000 | 5°C |
| 1800 | 6000 | 6°C |
| 2100 | 7000 | 7°C |
| 2500 | 8000 | 21°C |
| 2800 | 9000 | 39°C |
| 3100 | 10000 | Always |

(51) Int. Cl.
*F16H 59/64* (2006.01)
*F16H 59/66* (2006.01)

(56) References Cited

U.S. PATENT DOCUMENTS

| | | | |
|---|---|---|---|
| 5,707,315 A * | 1/1998 | Furukawa | F16H 59/72 |
| | | | 477/97 |
| 6,154,701 A * | 11/2000 | Loffler | B60W 10/06 |
| | | | 477/110 |
| 2005/0085966 A1* | 4/2005 | Eriksson | B60W 10/06 |
| | | | 701/36 |
| 2007/0114091 A1 | 5/2007 | Biallas | |
| 2008/0076632 A1* | 3/2008 | Watanabe | F16H 59/72 |
| | | | 477/98 |
| 2009/0118092 A1 | 5/2009 | Doering et al. | |
| 2009/0118922 A1* | 5/2009 | Heap | B60W 10/105 |
| | | | 701/54 |
| 2010/0105523 A1 | 4/2010 | Hrovat et al. | |
| 2012/0010792 A1 | 1/2012 | Nedorezov et al. | |
| 2012/0245812 A1 | 9/2012 | Anderson et al. | |
| 2013/0345021 A1* | 12/2013 | Koizumi | B60W 10/06 |
| | | | 477/98 |
| 2013/0345902 A1 | 12/2013 | Papajewski et al. | |

OTHER PUBLICATIONS

Combined Search and Examination Report under Sections 17 and 18(3) for Application No. GB1414029.7 dated Feb. 4, 2015.
Combined Search and Examination Report under Sections 17 and 18(3) for Application No. GB1314797.0 dated Feb. 26, 2014.

* cited by examiner

| GASOLINE | | |
|---|---|---|
| Altitude | | Ambient Temp |
| m | ft | 1st gear launch BELOW: |
| Sealevel | | -25°C |
| 650 | 2000 | -8°C |
| 900 | 3000 | -4°C |
| 1200 | 4000 | 1°C |
| 1500 | 5000 | 5°C |
| 1800 | 6000 | 6°C |
| 2100 | 7000 | 7°C |
| 2500 | 8000 | 21°C |
| 2800 | 9000 | 39°C |
| 3100 | 10000 | Always |

Fig 1

| DIESEL | | |
|---|---|---|
| Altitude | | Ambient Temp |
| m | ft | 1st gear launch ABOVE: |
| Sealevel | | 41°C |
| 650 | 2000 | 38°C |
| 900 | 3000 | 35°C |
| 1200 | 4000 | 33°C |
| 1500 | 5000 | 30°C |
| 1800 | 6000 | 14°C |
| 2100 | 7000 | Always |
| 2500 | 8000 | Always |
| 2800 | 9000 | Always |
| 3100 | 10000 | Always |

| Ambient Pressure (altitude) | | | | |
|---|---|---|---|---|
| 0 | 3000 | 6000 | 9000 | ft |
| 1013 | 924 | 835 | 747 | mBar |

Ambient Temperature °C

| | | | | |
|---|---|---|---|---|
| -20 | 400 | 365 | 330 | 295 |
| -10 | 385 | 351 | 317 | 284 |
| 0 | 371 | 338 | 306 | 274 |
| 10 | 358 | 327 | 295 | 264 |
| 20 | 346 | 315 | 285 | 255 |
| 30 | 334 | 305 | 276 | 247 |
| 40 | 324 | 295 | 267 | 239 |

Fig 4

| Cold Start | |
|---|---|
| 1st | 2nd |
| < -10°C | < -2°C |

Fig 5

| | | $P_A$ | | | | | |
|---|---|---|---|---|---|---|---|
| | | 600 | 650 | 720 | 780 | 850 | 980 |
| $T_A$ | -20 | 70 | 80 | 92 | 93 | 100 | 100 |
| | 5 | 70 | 80 | 85 | 92 | 100 | 100 |
| | 20 | 60 | 80 | 83 | 90 | 100 | 100 |
| | 30 | 60 | 80 | 80 | 85 | 96 | 100 |
| | 40 | 50 | 70 | 70 | 80 | 90 | 96 |
| | 50 | 50 | 60 | 65 | 70 | 75 | 80 |

|   | D |   |   |   |   |   |
|---|---|---|---|---|---|---|
|   | 50 | 60 | 70 | 80 | 90 | 100 |
| G -30 | 0 | 0 | 0 | 0 | 0 | 0 |
| -10 | 1400 | 1400 | 1350 | 1000 | 300 | 0 |
| -4 | 1400 | 1400 | 1350 | 1200 | 1100 | 0 |
| 4 | 1400 | 1400 | 1350 | 1200 | 1100 | 0 |
| 15 | 1500 | 1500 | 1500 | 1500 | 1500 | 400 |
| 20 | 1600 | 1600 | 1600 | 1600 | 1500 | 500 |
Fig 6
|   | $T_E$ |   |   |   |   |
|---|---|---|---|---|---|
|   | -30 | -20 | 0 | 20 | 40 |
| $T_T$ -30 | 1000 | 1000 | 1000 | 1000 | 1000 |
| -10 | 500 | 500 | 500 | 500 | 500 |
| 0 | 399 | 399 | 399 | 399 | 399 |
| 29 | 0 | 0 | 0 | 0 | 0 |
| 30 | 0 | 0 | 0 | 0 | 0 |
Fig 7
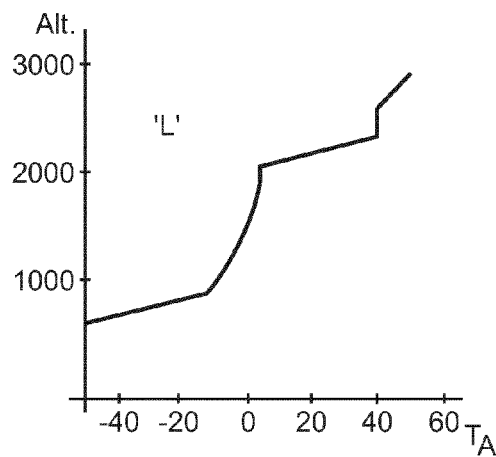
Fig 8
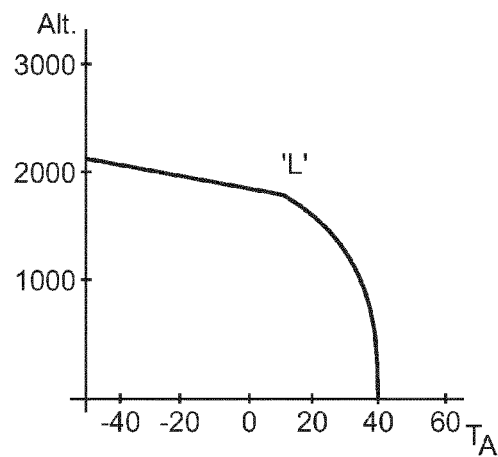
Fig 9

SELECTION OF LAUNCH RATIO IN A MULTI-SPEED AUTOMATIC TRANSMISSION

TECHNICAL FIELD

The present invention relates to a multi-speed automatic transmission for a vehicle, the transmission having more than one speed ratio available for vehicle launch from rest.

BACKGROUND TO THE INVENTION

Vehicle transmissions have been provided in recent years with an increasing number of individually selectable speed ratios. Seven or more speed ratios may be provided, and by doing so many factors relating to vehicle performance and economy can be enhanced.

Control strategies for automatic transmissions are highly complex, taking into account numerous external and internal factors to determine speed ratio selection and the timing of a speed ratio change. These strategies are generally incorporated within a shift map which comprises a decision matrix for all circumstances of use of the transmission. Implementing a new shift map to accommodate a new circumstance can be an extended and expensive exercise, since many factors influencing transmission behaviour have inter-related effects.

A particular transmission may have a well-developed shift map which meets circumstances of use. Such a shift map may not only control ratio selection and timing, but do so in several modes, such as 'comfort' and 'sport'. The mating of such a transmission to an alternative engine or vehicle may reveal certain shortcomings, which do not however warrant a change to the current shift map. Where several alternative engines are provided, several different shift maps may be indicated, with a consequent potential increase in cost and complication.

On the other hand vehicle manufacturers would prefer to minimize the number of transmission variants, both to reduce manufacturing and stocking inventory, and to minimize the number of different types of transmission in service.

Where a large number of speed ratios is provided, it may be possible to safely start from rest in more than one speed ratio, depending on external ambient factors, conditions of vehicle use etc. A vehicle driver will select the appropriate ratio in a manual transmission according to circumstances and experience, and may choose or be authorized to launch in second speed rather than first (lowest) speed if conditions are appropriate.

In the case of an automatically controlled transmission, a suitable control strategy is required in order to determine the appropriate speed ratio, and in the case of a transmission with many speeds to determine the launch ratio.

SUMMARY OF THE INVENTION

According to an aspect of the invention there is provided a method of determining the launch ratio of an automatically controlled multi-speed vehicle transmission comprising or having a shift map to determine ratio selection thereof, said method comprising providing in the transmission a plurality of speed ratios for vehicle launch, and commanding the ratio for launch by reference to ambient temperature and/or ambient pressure.

In an aspect of the invention there is provided a method for determining the launch ratio of an automatically controlled multi speed vehicle transmission, said method comprising providing in the transmission two or more speed ratios for vehicle launch and commanding the ratio for launch by reference to ambient temperature and/or ambient pressure and/or gradient. The vehicle transmission may comprise a shift map. The method may comprise the application of a calibrator, and it may be applied to the shift map. Said gradient may be a gradient on which the vehicle comprising the transmission is standing.

In an aspect of the invention, launch ratio is determined by reference to engine temperature and/or transmission temperature and/or engine speed and/or gradient direction.

In an embodiment, the method comprises selection of a lower speed ratio below a first pre-determined ambient pressure. Since ambient pressure is related to altitude, this aspect of the invention may be characterized as selection of a lower speed ratio above a pre-determined altitude, and throughout this specification it will be understood that references to ambient pressure may be substituted by reference to altitude according to the well known relationship.

In an embodiment, the method comprises selection of a higher speed ratio above a second pre-determined ambient pressure (i.e. closer to sea level).

In an embodiment the first and second pre-determined ambient pressures are the same. Alternatively they may be different.

In another embodiment the first and second pre-determined ambient pressures may be selectable. Accordingly different vehicle variants may use the same transmission and shift map, but be adapted to for example different engines according to the variation of power and/or torque of those engines at altitude. In one embodiment the ambient pressure at which selection of a lower speed ratio is determined for launch, is lower for a gasoline engine than for a diesel engine; in other words the altitude at which launch in the lower ratio is commanded is higher for a gasoline engine than for a diesel engine.

In an embodiment, the method comprises selection of a lower speed ratio below a pre-determined ambient temperature for a gasoline engined vehicle. In another embodiment the method comprises selection of a higher speed ratio above a pre-determined ambient temperature for a diesel engined vehicle.

The ambient temperature at which a lower speed ratio is commanded varies progressively, in one embodiment, with ambient pressure, and the lower speed ratio may be commanded for all temperatures below a threshold ambient pressure. The relationship between ambient temperature and ambient pressure may vary according to whether a gasoline or a diesel engine is provided, and the threshold ambient pressure may be different for gasoline and diesel engined variants. In one embodiment the threshold ambient pressure is lower for a gasoline engined variant than for a diesel engined variant.

According to a second aspect of the invention, there is provided a calibrator for a shift map of an automatically controlled vehicle transmission having individually selectable speed ratios, said calibrator determining launch ratio from a plurality of speed ratios and being responsive to ambient pressure and/or ambient temperature. In an embodiment of the invention, the calibrator may also be responsive to one or more of engine speed, engine temperature, transmission temperature, gradient, and direction of gradient.

A calibrator is conveniently provided as an addition to the electronic control module which contains the shift map of the transmission, but may alternatively be located in another module, such as an electronic engine control module, in communication with the module containing the shift map.

Such a calibrator forces selection of the launch ratio according to circumstances, to generally ensure acceptable vehicle response in conditions which may be at the edge of the normal vehicle operating envelope but which do not warrant a new shift map. Once launched, speed ratio selection is according to the pre-existing shift map, and the calibrator of the invention has no further effect until the next launch event. Thus a range of vehicles may be fitted with a common transmission and shift map, and only where necessary will a calibrator be applied. The calibrator may be different, for example for difference vehicles or models or ranges of vehicle, or for different countries, for example where different engine characteristics must be accommodated, or where the vehicle may be adapted to both on-road and off-road terrain.

The effort and expense of a calibrator for a particular variant of engine and/or vehicle may be justified, whereas a change of shift map may be precluded on grounds of cost and time.

The invention is particularly useful for vehicle launch, because the circumstances of clutch disengagement/engagement are somewhat distinct from those associated with a change of speed ratios on the move.

Typically a vehicle may be provided with a choice of gasoline or diesel engines, but with a common transmission. The vehicle performance characteristics may be comparable, and generally speaking the transmission may use the same shift map in either variant, but with an appropriate calibrator for vehicle launch.

In an embodiment of the invention a calibrator is adapted to force selection of launch at a lower speed ratio if altitude exceeds a selected threshold and either a gasoline engine is operating in an ambient temperature below a corresponding selected minimum or a diesel engine is operating in ambient temperature above a corresponding selected minimum. The selected minimum may be different for gasoline and diesel engined variants.

In an embodiment of the invention the calibrator may inhibit selection of launch at a higher speed ratio if the transmission temperature is below a predetermined first minimum. The calibrator may cause such inhibition to remain until transmission temperature is above a predetermined second minimum, wherein the second minimum is a higher temperature than the first minimum. In one embodiment the first minimum is −10° C. and the second minimum is −2° C.

In an embodiment of the invention the inhibition provided by the calibrator is applied to both a gasoline engined vehicle variant and a diesel engined vehicle variant.

Other features of the invention will be apparent from the appended claims.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

Other features of the invention will be apparent from the following description of embodiments shown by way of example only in the accompanying drawings in which:—

FIG. 1 is a table showing altitude and temperature parameters for an aspect of the invention, as applied to a first vehicle installation.

FIG. 2 is a table showing the corresponding parameters applied to a second vehicle installation.

FIG. 3 is a matrix showing dimensional values indicative of the relative effect of ambient pressure and ambient temperature for use in the invention.

FIG. 4 shows a cold start decision matrix.

FIG. 5 is a matrix showing dimensionless power values, indicative of the relative effect of ambient pressure and ambient temperature for use in FIG. 6.

FIG. 6 is a matrix combining the dimensionless values of FIG. 5 with gradient to give a minimum engine speed for higher launch ratio selection.

FIG. 7 is a matrix combining engine temperature and transmission temperature to give a minimum engine speed for higher launch ratio selection.

FIG. 8 shows graphically the relationship between altitude and ambient temperature for commanding a low launch ratio for a gasoline engined vehicle.

FIG. 9 corresponds to FIG. 8, and shows the relationship for a diesel engined vehicle.

DESCRIPTION OF EMBODIMENTS

With reference to FIG. 1, a calibrator for application to the shift map of an automatic vehicle indicates when launch in the lower of two possible launch ratios should be commanded. In one embodiment, a transmission has nine forward speeds, and may provide the options of vehicle launch in first and second speed ratios, and permit launch in second speed ratio when ambient conditions are benign.

The calibrator of FIG. 1 comprises a look-up table, which may be incorporated in the vehicle ECU which commands selection of the appropriate speed ratio. The table contains a range of possible values of altitude and ambient temperature, and comprises a decision matrix from which can be determined the launch ratio to be selected.

As will be apparent from FIG. 1, launch in first speed ratio is commanded in low ambient temperature at sea level, and as altitude increases the temperature threshold is also increased so that at maximum altitude a launch in first speed ratio is always commanded.

In use, whenever vehicle or transmission sensors indicate imminent vehicle launch, for example upon a shift from neutral to forward drive, the calibrator is applied to the output of the shift map so as to ensure that a normal second speed launch is substituted for by a first speed launch where conditions indicate that a first speed launch is appropriate.

In FIG. 1, approximate altitude is given in both meters and feet. It will be understood that the values of this table are indicative of a characteristic that can be represented graphically, so that a determination at any discrete value of altitude and ambient temperature is possible. Such a graphical representation is given in FIG. 8, in which the low launch ratio is commanded above the line (area 'L'). However a look-up table it may be preferable to provide a limited selection of discrete values within the range, and treat those values as thresholds. Thus, for example, the decision matrix may treat all altitudes in the range 1500-1799 m as 1500 m, and provide a change of state only upon breach of the next threshold at 1800 m.

In FIG. 1, for the purposes of explanation, altitude is specified. In practice however an input of absolute air pressure is relied upon, taking account of the characteristic by which air pressure falls progressively with increasing altitude. An electronic signal of air pressure is generally available from a suitable sensor on a vehicle CAN-BUS or like system, and similarly an electronic signal of ambient temperature is available from an external temperature sensor of the vehicle. Such sensors are generally provided for management of other vehicle systems, in particular engine systems. Operation of the embodiment also reflects real time changes of air pressure at any given altitude, due to meteorological conditions.

In use a comparator or processor compares instant values of pressure and ambient temperature in order to reach a launch ratio determination according to the decision matrix of FIG. 1, or a decision matrix of similar format thereof.

FIG. 1 illustrates a decision matrix for a gasoline engine.

FIG. 2 illustrates an alternative decision matrix which may be applied as a calibrator for the same vehicle transmission and shift map, when coupled to a diesel engine.

Characteristics of a diesel engine are different to those of a gasoline engine because, generally speaking, a diesel engine has comparatively better performance from cold start, but a comparatively reduced performance at high altitudes and low ambient temperature. A graphical representation for a diesel engined vehicle is given in FIG. 9, the low launch ratio being commanded above the line (area 'L')

A comparison of FIGS. 1 and 2 (or FIGS. 8 and 9) illustrates that the comparator offers a wide range of possibilities, not only to distinguish gasoline and diesel engined vehicles having the same transmission, but also to permit variants of gasoline and diesel engines to be accommodated.

As will be apparent from the narrative, FIG. 1 generally provides for first ratio launch below a specified temperature, whereas FIG. 2 provides for a first ratio launch above a specified temperature.

As noted above the invention avoids a change to the shift map for the transmission whilst providing a bespoke solution for different engine specifications at the limit of the shift map, i.e. when conditions are not benign. The comparator of the invention may be readily adjusted to suit circumstances, as will be apparent from the wide ranges of values in FIGS. 1 and 2.

As an alternative to the matrix tables of FIGS. 1 and 2, a formula or algorithm may be provided to give a dimensional value indicative of both parameters, and a threshold may be then applied to determine which of two launch ratios is to be commanded. This alternative allows a decision to be reached from any input value of ambient pressure (altitude) and ambient temperature.

A formula of the following general kind may be used.

$$PT = \frac{100 * P * X_1}{(T + 273) * X_2}$$

where
P=ambient pressure (e.g. millibars)
T=ambient temperature (° C.)
$X_1$=multiplication factor (default 1)
$X_2$=multiplication factor (default 1)

An example of some of the results of the application of such a formula is shown in FIG. 3, for some exemplar values of ambient temperature and ambient pressure (corresponding altitude in feet is also given).

For any combination of pressure and temperature, a value may be calculated for the parameter PT, and in the table of FIG. 3 a range from 239 to 400 is indicated. A threshold value, of say 320 may be indicative of a command for launch in a higher rather than a lower ratio.

In use the formula is applied in an electronic processor to input values indicative of ambient pressure and ambient temperature, and a command for first or second speed launch issued appropriately.

The constants $X_1$ and $X_2$ provide for variation to suit conventional factors associated with the vehicle installation, such as kind of engine, state of tune of engine, final drive ratio and so on.

In one embodiment of the invention an additional filter may be applied to accommodate extreme internal or external factors, for example cold start in cold conditions.

FIG. 4 illustrates such a filter in which cold start is indicated by one of cold engine temperature or cold transmission temperature, as indicated by for example the temperature of engine coolant and/or the temperature of the hydraulic fluid in the transmission.

In either case, or both, the lower speed ratio is commanded for launch below −10° C., and this regime is maintained for all subsequent launch events until the corresponding temperature(s) exceed −2° C.

The arrangement described by reference to FIG. 4 is implemented in the transmission control unit, and ensures that the lower ratio is commanded when the lower temperature limit is breached. In the event that the higher speed ratio is permitted, the decision matrices of FIGS. 1-3 may be followed.

As a further option, certain other factors may be introduced, dependent on vehicle and engine specification, to deal with limit conditions in which launch in the higher ratio is not advised. Such factors may include engine speed, gradient and direction of gradient with respect to the forward vehicle direction, so that launch in a lower ratio may be indicated where engine speed is below a threshold and/or gradient is above a threshold. The gradient factor may be different depending on the direction that the vehicle is facing.

In one embodiment the engine speed and gradient factors may be applied to the outcome of the decision matrix of FIGS. 1-3 to command the lower launch ratio when gradient exceeds a threshold (±15%) or when engine speed is below a threshold (e.g. 800 rpm).

The gradient and engine speed factors may be linked in a matrix of the kind indicated in FIG. 3, so that a higher ratio launch may be permitted for a steeper gradient if the engine speed is sufficiently high.

In one embodiment a dimensionless value indicative of ambient pressure and ambient temperature (for example using the formula mentioned above) is applied in a second matrix to values of gradient to determine a minimum allowable engine idle sped for launch in the higher ratio.

Likewise engine temperature and transmission temperature can be applied in a third matrix to indicate the minimum idle speed for launch in the higher ratio.

With reference to FIG. 5, a matrix shows ambient temperature $T_A$ and ambient pressure $P_A$ combined to give dimensionless values indicative of the percentage of maximum engine performance which is available; the illustrated range is 50-100%.

These percentage values (D) are applied in the matrix of FIG. 6 to a measure of gradient (G) in the range −30% to +20%, to give a cross-referenced outcome indicative of the minimum engine speed for which launch in the higher launch ratio is permitted. Below these engine speeds launch in the lower launch ratio is commanded.

Additionally FIG. 7 shows a matrix in which engine temperature $T_E$ and transmission temperature $T_T$ are compared to give a minimum engine speed at which launch in the higher launch ratio is permitted, and below which launch in the lower launch ratio is commanded. Engine temperature is in the range −30° C. to 40° C., and transmission temperature in the range −30° C. to +30° C.

The invention may additionally include the option of requiring a minimum engine speed in order for the calibrator of the invention to be applied. Such a minimum may be for example 500 rpm±100 rpm.

The invention is described in relation to selection of one or other forward speed ratio; however it is also applicable to reverse where more than one speed ratio is available. The temperature ranges mentioned in the examples may be extended if required to include extremes of hot and cold. Aspects of the invention may also be applied in principle to situations where more than two possible launch speed ratios may be possible—where, for example: the number of speed ratios available is high and/or the ratios are close enough; where the available torque derivable from an engine and/or other power means (such as an electric machine, which may be additional or supplementary to the engine of a vehicle) may be high enough; where a vehicle may be launching on a suitable gradient such that a higher than normal speed ratio may be available for launch; where launch at a higher ratio is desirable for purposes of fuel efficiency or emissions control.

Various changes may be made to the invention within the scope of the claims appended hereto, in particular the ranges and thresholds given in the figures, it being understood that the values applicable will vary according to the kind of engine and power/torque characteristics thereof.

Certain aspects of the invention are stated in the numbered paragraphs that follow:

1. A method of determining the launch ratio of an automatically controlled multi-speed vehicle transmission having a shift map to determine ratio selection thereof, said method comprising:
providing in the transmission a plurality of speed ratios for vehicle launch, and determining the launch ratio by reference to ambient temperature and/or ambient pressure.

2. A method according to aspect 1 comprising determining a lower launch ratio below a pre-determined ambient pressure.

3. A method according to aspect 1 comprising determining a higher launch ratio above a pre-determined ambient pressure.

4. A method according to aspect 1 applied to a gasoline and diesel engined variants, and wherein said pre-determined ambient pressure is lower for the gasoline engined variant than for the diesel engined variant.

5. A method according to aspect 1 applied to a gasoline engined variant, comprising determining a lower launch ratio below a pre-determined ambient temperature.

6. A method according to aspect 5 wherein said pre-determined ambient temperature is dependent on ambient pressure.

7. A method according to aspect 6, wherein said pre-determined ambient temperature progressively increases as ambient pressure progressively reduces.

8. A method according to aspect 7 applied to ambient temperature in the range −25° C. to 39° C., and an ambient pressure in the range 1050-750 mbar.

9. A method according to aspect 1 applied to a diesel engined variant, comprising determining a lower launch ratio above a pre-determined ambient temperature.

10. A method according to aspect 1 wherein said pre-determined ambient temperature is dependent on ambient pressure.

11. A method according to aspect 10 wherein said pre-determined ambient temperature progressively reduces as ambient pressure progressively reduces.

12. A method according to aspect 1 comprising determining a lower launch ratio below a first ambient temperature and subsequently maintaining said launch ratio until temperature is above a second ambient temperature.

13. A method according to aspect 1, and for determining launch ratio by reference to one or more of engine speed, engine temperature, transmission temperature, gradient and direction of gradient.

14. A method according to aspect 13 and including determining a first numerical factor in the range 50-100 relating ambient pressure and ambient temperature, said first factor having the lowest numerical value for high temperature and low pressure, and highest numerical value for low temperature and high pressure,
determining a second numerical factor relating said first factor and gradient in the range −30% to +20%, said second factor being indicative of a minimum vehicle engine speed at which a lower launch ratio is permitted,
and commanding launch in the lower launch ratio should engine speed be less than the numerical value of the second factor.

15. A method according to aspect 13 including relating temperature of the vehicle transmission in the range −30° C. to +30° C. to the temperature of a vehicle engine for said transmission in the range −30° C. to +40° C., to give a threshold engine speed below which a lower launch ratio is commanded, said threshold engine speed being highest for the lowest transmission temperature and lowest engine temperature in combination, and lowest for the highest transmission temperature and highest engine temperature in combination.

16. A method according to aspect 15 wherein the threshold engine speed is in the range 0-1000 rpm.

17. A calibrator for application to the shift map of an automatically controlled multi-speed vehicle transmission, said calibrator comprising a processor and memory for implementing the method of aspect 1.

18. An electronic control unit for automatically selecting a speed ratio of a multi-speed vehicle transmission according to a shift map, said shift map including a calibrator for implementing the method of aspect 1.

19. An automatically controlled multi-speed transmission of a vehicle having an electronic control unit according to aspect 18.

20. A vehicle incorporating the transmission of aspect 19.

The invention claimed is:

1. A method of determining a launch speed ratio of an automatically controlled multi-speed vehicle transmission having a shift map to determine a ratio selection, the method comprising:
providing in the transmission a plurality of speed ratios for vehicle launch, and determining which one of the plurality of speed ratios is to be selected in the transmission as the launch speed ratio by reference to ambient temperature.

2. A method according to claim 1 comprising determining which one of the plurality of speed ratios is to be selected in the transmission as the launch speed ratio by reference to ambient pressure.

3. A method according to claim 2 comprising determining a first launch speed ratio when the ambient pressure is below a pre-determined ambient pressure or determining a second launch speed ratio when the ambient pressure is above a pre-determined ambient pressure and wherein the second launch speed ratio is higher than the first launch speed ratio.

4. A method according to claim 3 applied to gasoline and diesel engined variants, and wherein said pre-determined ambient pressure is lower for the gasoline engined variant than for the diesel engined variant.

5. A method according to claim 1 applied to a gasoline engined variant, comprising determining a lower launch speed ratio when the ambient temperature is below a pre-determined ambient temperature.

6. A method according to claim 5 wherein said pre-determined ambient temperature is dependent on ambient pressure.

7. A method according to claim 6, wherein said pre-determined ambient temperature progressively increases as ambient pressure progressively decreases.

8. A method according to claim 7 applied to ambient temperature in a range from −25° C. to 39° C., and an ambient pressure in a range from 1050 to 750 mbar.

9. A method according to claim 1 applied to a diesel engined variant, comprising determining a lower launch speed ratio when the ambient temperature is above a pre-determined ambient temperature.

10. A method according to claim 9 wherein said pre-determined ambient temperature is dependent on ambient pressure.

11. A method according to claim 10 wherein said pre-determined ambient temperature progressively decreases as ambient pressure progressively decreases.

12. A method according to claim 11 applied to ambient temperature in a range from 41° C. to 14° C., and ambient pressure in a range from 1050 to 800 mbar.

13. A method according to claim 1 comprising determining a lower launch speed ratio when the ambient temperature is below a first ambient temperature and subsequently maintaining said launch speed ratio until the ambient temperature is above a second ambient temperature.

14. A method according to claim 13 wherein the first ambient temperature is in a range from −15° C. to −6° C. and the second ambient temperature is in a range from −5° C. to 0° C.

15. A method according to claim 1 including
determining a first numerical factor in a range from 50-100 relating ambient pressure and ambient temperature, said first factor having a lowest numerical value for high temperature and low pressure, and a highest numerical value for low temperature and high pressure;
determining a second numerical factor relating said first factor and gradient in a range from −30% to 20%, said second factor being indicative of a minimum vehicle engine speed at which a lower launch speed ratio is permitted; and
commanding launch in said lower launch speed ratio should engine speed be less than the numerical value of the second factor.

16. A method according to claim 1 including relating a temperature of the vehicle transmission in a range from −30° C. to +30° C. to a temperature of a vehicle engine for said transmission in a range from −30° C. to +40° C., to give a threshold engine speed below which a lower launch speed ratio is commanded, said threshold engine speed being highest for the lowest transmission temperature and lowest engine temperature in combination, and lowest for the highest transmission temperature and highest engine temperature in combination.

17. A calibrator for application to the shift map of an automatically controlled multi-speed vehicle transmission, said calibrator comprising a processor and memory for implementing the method of claim 1.

18. An electronic control unit for automatically selecting a speed ratio of a multi-speed vehicle transmission according to a shift map, said shift map including a calibrator for implementing the method of claim 1.

19. An automatically controlled multi-speed transmission of a vehicle having a plurality of speed ratios, a shift map for determining speed ratio selection, and a calibrator according to claim 18 applied to said shift map.

20. An automatically controlled multi-speed transmission of a vehicle having an electronic control unit according to claim 18.

21. A vehicle incorporating the transmission of claim 20.

* * * * *